US 11,881,980 B2

(12) United States Patent
Griffin et al.

(10) Patent No.: US 11,881,980 B2
(45) Date of Patent: Jan. 23, 2024

(54) BYZANTINE FAULT PREVENTION IN MESH NETWORKS

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/726,958

(22) Filed: Apr. 22, 2022

(65) Prior Publication Data

US 2023/0344699 A1 Oct. 26, 2023

(51) Int. Cl.
*H04L 41/0604* (2022.01)
*H04L 41/0668* (2022.01)
*H04L 41/0631* (2022.01)

(52) U.S. Cl.
CPC ...... *H04L 41/0627* (2013.01); *H04L 41/0631* (2013.01); *H04L 41/0668* (2013.01)

(58) Field of Classification Search
CPC ............. H04L 41/0627; H04L 41/0631; H04L 41/0668
USPC ....................................................... 709/224
See application file for complete search history.

(56) References Cited

U.S. PATENT DOCUMENTS

| 6,587,860 | B1 * | 7/2003 | Chandra | G06F 11/1482 |
| | | | | 707/999.009 |
| 6,757,836 | B1 * | 6/2004 | Kumar | G06F 11/1425 |
| | | | | 714/13 |
| 6,862,613 | B1 * | 3/2005 | Kumar | G06F 11/181 |
| | | | | 714/4.11 |
| 8,024,432 | B1 * | 9/2011 | Sharma | G06F 9/5061 |
| | | | | 709/224 |
| 10,846,182 | B2 | 11/2020 | Tang | |
| 10,873,625 | B2 | 12/2020 | Zeng et al. | |
| 11,271,800 | B1 | 3/2022 | Rizvi et al. | |
| 2003/0159084 | A1 * | 8/2003 | Murphy | G06F 11/203 |
| | | | | 714/13 |
| 2003/0182177 | A1 * | 9/2003 | Gallagher | G06Q 30/02 |
| | | | | 705/7.32 |
| 2005/0097510 | A1 * | 5/2005 | Manuel | G06F 9/4411 |
| | | | | 717/116 |

(Continued)

FOREIGN PATENT DOCUMENTS

| CN | 111291110 A | 6/2020 |
| CN | 112395113 A | 2/2021 |

OTHER PUBLICATIONS

Merriam-Webster's Collegiate Dictionary 811,1346 (10th ed. 1993) (Year: 1993).*

(Continued)

*Primary Examiner* — David P Zarka
(74) *Attorney, Agent, or Firm* — Womble Bond Dickinson (US) LLP

(57) ABSTRACT

Embodiments of the present disclosure include a processing device that, responsive to detecting an unavailability of a first node device of a plurality of node devices of a network, activates a proxy device to correspond to the first node device, detects a consensus operation among the plurality of node devices, wherein the consensus operation comprises a plurality of vote transmissions within the network, and controls the proxy device to provide a proxy vote transmission as part of the consensus operation.

14 Claims, 6 Drawing Sheets

(56) References Cited

U.S. PATENT DOCUMENTS

| | | | | |
|---|---|---|---|---|
| 2005/0288996 | A1* | 12/2005 | Wallman | G06Q 40/10 |
| | | | | 705/12 |
| 2007/0288953 | A1* | 12/2007 | Sheeman | G06Q 30/08 |
| | | | | 725/34 |
| 2010/0049647 | A1* | 2/2010 | De Chabris | G06Q 40/04 |
| | | | | 705/37 |
| 2017/0330174 | A1* | 11/2017 | Demarinis | G06Q 40/04 |
| 2018/0350180 | A1* | 12/2018 | Onischuk | G07C 13/00 |
| 2019/0354518 | A1 | 11/2019 | Zochowski | |
| 2020/0034553 | A1* | 1/2020 | Kenyon | H04L 9/3239 |
| 2020/0167319 | A1 | 5/2020 | Fritz et al. | |

OTHER PUBLICATIONS

Red Hat, Inc., European Search Report dated Dec. 21, 2022 from EP 22183204.1-1216, 8 pages.

Zhang Jinging et al., "DBFT: A Byzantine Fault Tolerant Protocol with Graceful Performance Degradation," 2019 38th Sypmposium On Reliable Distributed Systems (SRDS), IEEE, Oct. 1, 2019, pp. 123-132, XP033751048, DOI: 10.1109/SRDS47363.2019.00023 [retreived on Mar. 27, 2020].

\* cited by examiner

BYZANTINE FAULT PREVENTION IN MESH NETWORKS

TECHNICAL FIELD

Aspects of the present disclosure relate to networked devices, and more particularly, to consensus operations performed with respect to client devices of a mesh network.

BACKGROUND

A mesh network is a network topology that includes nodes (i.e. bridges, switches, internet-of-things (IoT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices and different devices may provide different services within the mesh network. In some cases, the client devices within the mesh network may be connected in an ad hoc fashion, with communication within the mesh network being provided, in part, in a decentralized fashion.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
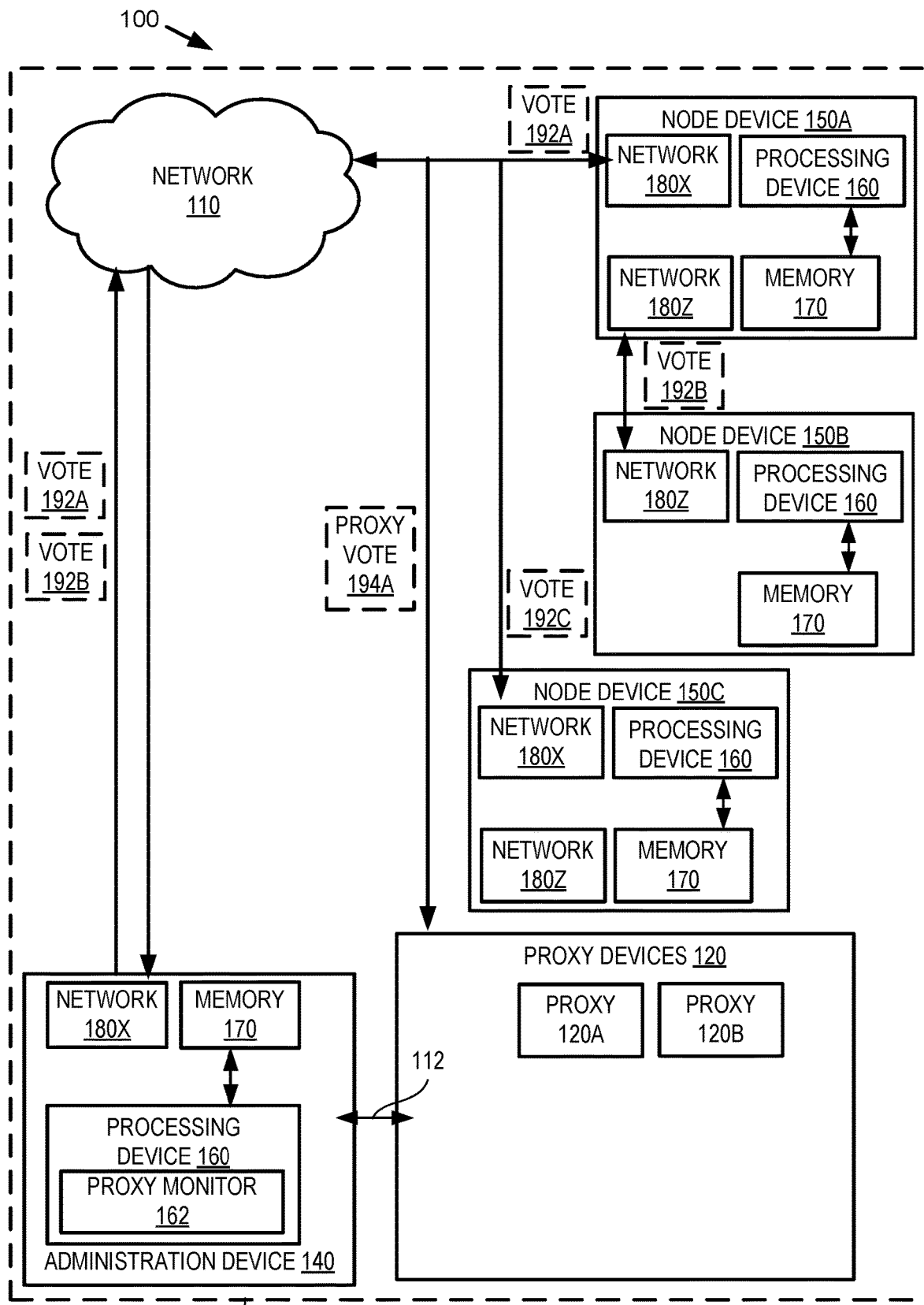
FIG. 1 is a block diagram that illustrates an example of a network architecture, in accordance with one or more aspects of the present disclosure.

Internet-of-things (IoT) devices have become increasingly ubiquitous and, as a result, various solutions have been proposed to communicate with and between large networks of IoT devices. IoT devices can have various types of software and/or hardware configurations. By networking the IoT devices together, functionalities performed by one of the IoT devices may be provided as a service to other IoT devices that lack that functionality. For example, some IoT devices may have a particular type of processing functionality (such as authentication or password management) that may be provided to other IoT devices in the network.

In some embodiments, the IoT devices may be interconnected together as node devices in a mesh network. The mesh network may be non-hierarchical with various interconnections formed between the node devices as they join and leave the mesh network. In some mesh networks, the respective power states of the node devices of the network may be transient. For example, the node devices may have relatively limited power capability, and may activate to perform a task and then deactivate. For example, some node devices may activate to process a particular event, and then go dormant to save power.

These characteristics of such devices can be problematic in mesh networks in which consensus-based decisions are being made, such as in a blockchain. In such consensus operations, a subset, typically greater than 50%, of the node devices must agree for a given operation to be considered valid (e.g., adding a block to a blockchain). These consensus operations are often performed to provide Byzantine fault tolerance. Byzantine fault tolerance refers to an ability of a network (or other distributed system) to make decisions despite a lack of guarantees about the availability (or reliability) of those participating in the decision making process. There are a number of mechanisms to provide Byzantine fault tolerance among node devices of a network, but many of mechanisms utilize some type of consensus operation, in which a majority decision of the node devices is assumed to be valid.

Such a consensus operation, however, can become unwieldy or unreliable if more than a third of the node devices have failed (or are unreliable). (See, e.g., Pease, Marshall; Shostak, Robert; Lamport, Leslie (April 1980). "Reaching Agreement in the Presence of Faults". Journal of the Association for Computing Machinery. 27 (2): 228-234.) Such a limitation can cause problems in certain types of mesh networks, such as those including IoT devices, in which the node devices may be routinely offline (e.g., for power conservation) and may not always be present during a consensus operation. This can make it difficult to incorporate non-hierarchical decision making, such as that used for blockchain operations, in a mesh network.

Aspects of the disclosure address the above-noted and other deficiencies by providing a mesh network architecture with the ability to generate proxy node devices in a mesh network to accommodate offline node devices. In some embodiments, an administration device may participate in the network and have a view of the overall network at any given time. When the administration device detects that a node device has gone offline, which may be, e.g., for power or network reasons, the administration device may create a pseudo node device (also referred to herein as a proxy device) and propose the pseudo node device for participation in any consensus operations that would have involved the offline node device. The pseudo node device may participate in consensus operations, such as blockchain operations, in lieu of the offline node device. The administration device may maintain a mapping between the real node device and the pseudo node device, such that when the real node device comes back online, the pseudo node device will be removed to bring the network back to equilibrium. The embodiments of the present disclosure provide resiliency for the mesh network and can, in some embodiments, be adapted to trigger when the members of the chain fall below a threshold percentage to save on resources. In some embodiments, a time duration before a pseudo node device will be generated and/or removed from the network may be configurable to avoid route flapping issues due to node devices connecting and disconnecting in a short time. In some embodiments, the generation of the pseudo node device may include the generation of various types of auditing information, which may allow other members of the mesh network to become aware that a membership issue exists. Embodiments of the present disclosure provide a mechanism by which mesh networks including IoT, or other types of power-transient, devices may still support consensus type operations, such as those performed in blockchain configurations, without having to sacrifice the power-savings or dynamic configuration of the mesh network.

FIG. 1 depicts a high-level component diagram of an illustrative example of a mesh network architecture 100, in accordance with one or more aspects of the present disclosure. Although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As shown in FIG. 1, mesh network architecture 100 includes a plurality of computing devices, including an administration device 140 and a plurality of node devices 150. For convenience of description, only three node devices 150, including a first node device 150A, a second node device 150B, and a third node device 150C are illustrated, but it will be understood that additional node devices 150 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The administration device 140 and node devices 150 include one or more processing devices 160, memory 170, which may include volatile memory devices (e.g., random access memory (RAM)), non-volatile memory devices (e.g., flash memory) and/or other types of memory devices, and one or more network interfaces 180. In certain implementations, memory 170 may be non-uniform access (NUMA), such that memory access time depends on the memory location relative to processing device 160. It should be noted that although, for simplicity, a single processing device 160 is depicted in each of the administration device 140 and node devices 150 depicted in FIG. 1, other embodiments of the administration device 140 and node devices 150 may include multiple processing devices, storage devices, or other devices.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the administration device 140 and node devices 150 may have different types of processing device 160.

The administration device 140 and node devices 150 may be a server, a mainframe, a workstation, a personal computer (PC), a mobile phone, a palm-sized computing device, a virtual instance of a computing device, etc. In some embodiments, one or more of the administration device 140 and node devices 150 may be an IoT device. In some embodiments, one or more of the administration device 140 and node devices 150 may be a nanotech device. In some embodiments, nanotech devices may have a longest dimension that is less than 100 nm. For clarity, some components of the administration device 140 and node devices 150 are not shown.

In some embodiments, the administration device 140 and the node devices 150 may be directly or indirectly communicatively coupled through one or more of the network interfaces 180. For example, the administration device 140 and one or more of the node devices 150 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the administration device 140 and one more of the node devices 150.

The administration device 140 and the node devices 150 may include a plurality of network interfaces 180. The network interfaces 180 may communicate with a plurality of network types. The variety of network interfaces 180 may allow for various configurations of network connectivity between the administration device 140 and the node devices 150.

For example, administration device 140 may include a first network interface 180X. The first network interface 180X may communicate with and/or within the network 110. One or more of the node devices 150, e.g., first node device 150A and a third node device 150C, may also include the first network interface 180X. Thus, the first node device 150A may be capable of communicating with the administration device 140 over network 110 using the first network interface 180X.

A second node device of the node devices 150, e.g., second node device 150B, may not include the first network interface 180X. Thus, the second node device 150B may not be capable of directly communicating over network 110. Instead, the second node device 150B may be communicatively coupled to the network 110 through a second network interface 180Z that is coupled to the first node device 150A (e.g., as a point-to-point connection). That is to say that the first node device 150A may serve as a relay for communications between the second node device 150B and the network 110. For example, the second node device 150B may be capable of communicating with the administration device 140 through the second network interface 180Z between the first and second node devices 150A, 150B and through the first network interface 180X between the first node device 150A and the administration device 140 (over network 110). In some embodiments, the first and/or second network interface 180X, 180Z may include a wireless technology, such as WIFI®, Bluetooth, Home radio frequency (Home RF), to name a few examples.

The administration device 140, the first node device 150A, the second node device 150B, the third node device 150C and the network connections therebetween may form the mesh network 115. The mesh network 115 may provide an interconnected and non-hierarchical network between members of the mesh. Devices (e.g., node devices 150) may join or leave the mesh network 115, and communication between members of the mesh over various network connections of the mesh may be dynamically routed responsive to changes in the mesh configuration.

The node devices 150 may perform one or more services within the mesh network 115. As used herein, a "service" provided by the node device 150 refers to a task or other technical activity performed by the node device 150 on behalf of or for another node device 150 or other device external to the mesh network 115. A service may include computer program logic utilized to provide the specified task or technical activity. Thus, a service can be implemented in hardware, firmware, and/or software. In one embodiment, services are stored on a non-transitory storage device (i.e., a computer program product), loaded into a memory, and executed by one or more processing devices. In some embodiments, the service may be provided by execution of computer instruction code on processing device 160. Examples of services include, but are not limited to, a blockchain service, an authentication service, a storage service, a gateway service, a processing service, a power management service, a web server service, and/or a packaging service. The above examples of services are merely examples, and are not intended to limit the present disclosure. One of ordinary skill in the art will recognize that other types of services may be provided within the mesh network 115 without deviating from embodiments of the present disclosure.

In some embodiments, one or more of the node devices 150 may be configured to perform a consensus operation. An example of a consensus operation is an operation that is associated with a task and/or a decision and that requires a threshold number of approvals from node devices 150 within the network 110 before the task may be performed and/or the decision approved. As an example, a consensus operation may be used to approve whether a particular node device 150 may join the mesh network 115. As another example, if the node devices 150 are part of a blockchain configuration, a consensus operation may be performed to approved tasks and/or decisions related to the blockchain, such as the addition of a new block.

In some embodiments, the threshold for the consensus operation may be greater than 50% of the node devices 150. The consensus operation may involve the exchange of votes 192 on the mesh network 115. The votes 192 may be in the form of data structures that are transmitted and propagated within the mesh network 115, and the vote 192 may indicate a status of approval or disapproval by the node device 150 of a proposed operation. The vote 192 of one node device 150 may be visible by other ones of the node devices 150. Thus, a node device 150 that is a member of the consensus operation may both vote (e.g., by transmitting vote 192 to the mesh network 115) as well as see the votes 192 of other members of the mesh network 115. In a consensus operation, each of the node devices 150 may separately make a decision on the consensus operation based on the votes 192 that it receives. For example, if the majority of the votes 192 received by the node device 150 indicate approval, the consensus operation may be approved. In such a way, a non-hierarchical decision may be made based on the consensus votes 192 that are received without a decision being mandated from another source.

As previously discussed, if some of the node devices 150 are unavailable to provide a vote 192, it may be difficult, or impossible, to reach consensus. For example, the stability of the consensus vote may be jeopardized if one-third or more of the available node devices 150 are unavailable. Looking at the example of FIG. 1, if a single one of the node devices 150, say the third node device 150C, is no longer present or responding, then a vote of the remaining node devices 150 will be either 100% approval (e.g., unanimous) or 50% (less than a majority). While a consensus can be reached, it must be unanimous, while consensus (e.g., a majority) could be reached with less than unanimity if the third node device 150C were present/responding. As the number of node devices 150 of the mesh network 115 increases, the stability of the consensus operation increases. However, the consensus operation may nonetheless be vulnerable of more than one-third of the node devices 150 are unavailable.

In some embodiments, the mesh network 115 may be formed from node devices 150 which frequently leave the mesh network 115, either by disconnecting (e.g., in a mobile network) or powering off (e.g., for node devices 150 that may conserve power by powering off, such as an IoT device). In this and similar circumstances, it may be difficult to maintain a consensus operation, as the one-third (or greater) of the node devices that would preferably be available for the consensus operation may be present at one moment and then gone from the mesh network 115.

To avoid disruptions to consensus operations, the administration device 140 may maintain and/or create a plurality of proxy devices 120. The proxy devices 120 may be configured to act as pseudo node devices to provide proxy votes 194 for a consensus operation. The proxy votes 194 may be orchestrated by the administration device 140 to replace a failed or otherwise non-responsive node device 150.

In some embodiments, the proxy device 120 may be a containerized application running on the administration device 140 or other system in the mesh network 115. In some embodiments, the proxy device 120 may be a virtual machine running on the administration device 140 or other system in the mesh network 115. In some embodiments, the proxy device 120 may be a separate node device 150 that is a spare or otherwise idle node device 150.

In some embodiments, the administration device 140 and the proxy devices 120 may (e.g., may be operatively coupled, communicatively coupled, may communicate data/messages with each other) via administrative network 112. The administrative network 112 may allow the administration device 140 to provide voting instructions to the proxy device 120. In some embodiments, the administrative network 112 may be an encrypted or otherwise secured network interface.

The proxy devices 120 may be configured to receive an instruction from the administration device 140 (e.g., over the administrative network 112) for how to vote in a particular consensus operation, and provide a proxy vote 194 accordingly. For example, the proxy devices 120 may receive an instruction from the administration device 140 over the administrative network 112 and may provide a proxy vote 194A onto network 110, e.g., so that the proxy vote 194 may be seen by the other node devices 150. Each of the proxy devices 120, when operational, may be capable of providing a separate proxy vote 194. Thus, a proxy device 120A may be capable of providing a proxy vote 194A to the network 110, a proxy device 120B may be capable of providing a proxy vote 194B to the network 110, and so on.

The proxy votes 194 may be seen by the other node devices 150 and be acted upon as if they came from another node device 150. In some embodiments, the proxy votes 194 may be indistinguishable (e.g., be a same data structure) as the votes 192. In some embodiments, the proxy votes 194 may contain additional data indicating that they are a proxy vote 194 and, in some embodiments, for which node device 150 the proxy vote 194 is intended. The proxy devices 120 may allow the administration device 140 to provide proxy votes 194 to the network so that consensus operation may continue.

The administration device 140 may activate proxy devices 120 responsive to determining that one or more of the node devices 150 is non-responsive and/or that a consensus operation has begun. In some embodiments, the processing device 160 of the administration device 140 may execute code instructions, such as proxy monitor 162, to monitor the mesh network 115 for the need of a proxy device 120. For example, the administration device 140 may monitor the status of each of the node devices 150 to determine if the node device 150 is no longer responding to network communication and/or has left the mesh network 115. For example, the administration device 140 may send a query or other network transmission to a particular node device 150 to determine if the node device 150 responds. In some embodiments, the administration device 140 may be configured to receive a regular signal (e.g., a "heartbeat") from each node device 150, and may consider the node device 150 to be unavailable if the regular signal is not received when expected. The administration device 140 may track the status of each of the node devices 150 of the mesh network 115 over time.

In some embodiments, the administration device 140 may activate a corresponding proxy device 120 as soon as it is determined that a node device 150 is offline, but the embodiments of the present disclosure are not limited to this configuration. In some embodiments, the administration device 140 may delay activating a proxy device 120 until the number of available node devices 150 falls below a threshold percentage. For example, proxy devices 120 may be activated if 25% or more of the node devices 150 of the mesh network 115 become unavailable. By waiting until a threshold percentage of the node devices 150 have gone offline, the administration device 140 may delay interfering with consensus operations until the number of absent node devices 150 threaten to impact the efficiency of the consensus operation (e.g., greater than one-third of the node devices 150 are absent). In some embodiments, the administration device 140 may alternately or additionally wait for a defined time duration to elapse after determining that a node device 150 is unavailable before activating a proxy device 120. This may avoid or reduce premature substitution of a proxy device 120 due to a node device 150 connecting and disconnecting in a short time.

Responsive to a consensus operation, the administration device 140 may establish or otherwise enable one of the proxy devices 120 to provide a proxy vote 194 for a node device 150 that is no longer responding to network communication. In some embodiments, enabling the proxy device 120 may include activating a container containing executable code configured to receive instructions on how to vote and to transmit a proxy vote 194 to the mesh network 115. In some embodiments, enabling the proxy device 120 may include activating or otherwise starting a virtual machine. In some embodiments, enabling the proxy device 120 may include activating or otherwise starting a spare node device 150 to perform the proxy voting. The administration device 140 may maintain a mapping (e.g., as a data structure) between an activated proxy device 120 and the inactive/absent node device 150 to which it corresponds. In some embodiments, the administration device 140 may transmit or otherwise provide an indication to the other node devices 150 of the mesh network 115 that one or more proxy devices 120 will join the mesh network 115 and/or the consensus operation.

The proxy device 120 may provide a proxy vote 194 according to instructions provided by the administration device 140. For example, the administration device 140 may listen on the mesh network 115 to the votes 192 being provided by the present node devices 150. The administration device 140 may wait to determine whether a consensus is forming among the present node devices 150 before providing instructions to the proxy device(s) 120. For example, because the administrations device 140 is tracking the status of the node devices 150 that are present in the mesh network 115, the administration device 140 may wait until votes 192 are transmitted by a threshold percentage of the present node devices 150 before providing instructions to the proxy devices 120 (e.g., via administrative network 112).

As an example, the administration device 140 may wait until greater than 50%, greater than 75%, or greater than 85% of the present node devices 150 have provided a vote 192 before providing instructions to the proxy devices 120 that indicate whether the proxy devices 120 should approve or disapprove the consensus operation via their proxy vote 194. In some embodiments, the administration device 140 will operate to minimize disruption to the consensus operation that may be due to the proxy devices 120. For example, the administration device 140 may determine, after reaching the threshold number of votes 192, whether a majority of the received votes 192 favor approval or disapproval of the consensus operation. For example, if a majority of the transmitted votes 192 within the mesh network 115 opt for approval, then the administration device 140 may provide instructions to the proxy devices 120 to transmit proxy votes 194 voting for approval. Otherwise (e.g., less than a majority of the transmitted votes 192 within the mesh network 115 opt for approval), the administration device 140 may provide instructions to the proxy devices 120 to transmit proxy votes 194 voting for disapproval. In this way, the administration device may allow the proxy devices 120 to support an already evolving decision of the mesh network 115, while providing enough votes to allow the consensus operation to complete.

In some embodiments, the proxy devices 120 may be deactivated within a short time period after providing a proxy vote 194. For example, the administration device 140 may deactivate the proxy device 120 within thirty seconds, or within a minute, after the proxy vote 194. In some embodiments, a proxy device 120 may be reactivated, when the appropriate thresholds are met, for each consensus operations, but the embodiments of the present disclosure are not limited thereto. In some embodiments, the proxy device 120 may remain active while its corresponding node device 150 remains inactive/offline.

Though the prior example provided a discussion in which the decision of the administration device 140 was based on a simple majority of transmitted votes 192, the embodiments of the present disclosure are not limited thereto. In some embodiments, the administration device 140 may utilize a higher threshold of approval votes for its instructions. For example, the administration device 140 may wait for at least 60% of a threshold number of transmitted votes 192 within the mesh network 115 to opt for approval before providing instructions to the proxy devices 120 to transmit proxy votes 194 voting for approval. A higher threshold of approval votes may tend to reduce changes (e.g., by disapproving consensus operations) when a higher number of node devices 150 are not available unless a clear consensus has already been made apparent.

Figure 2:
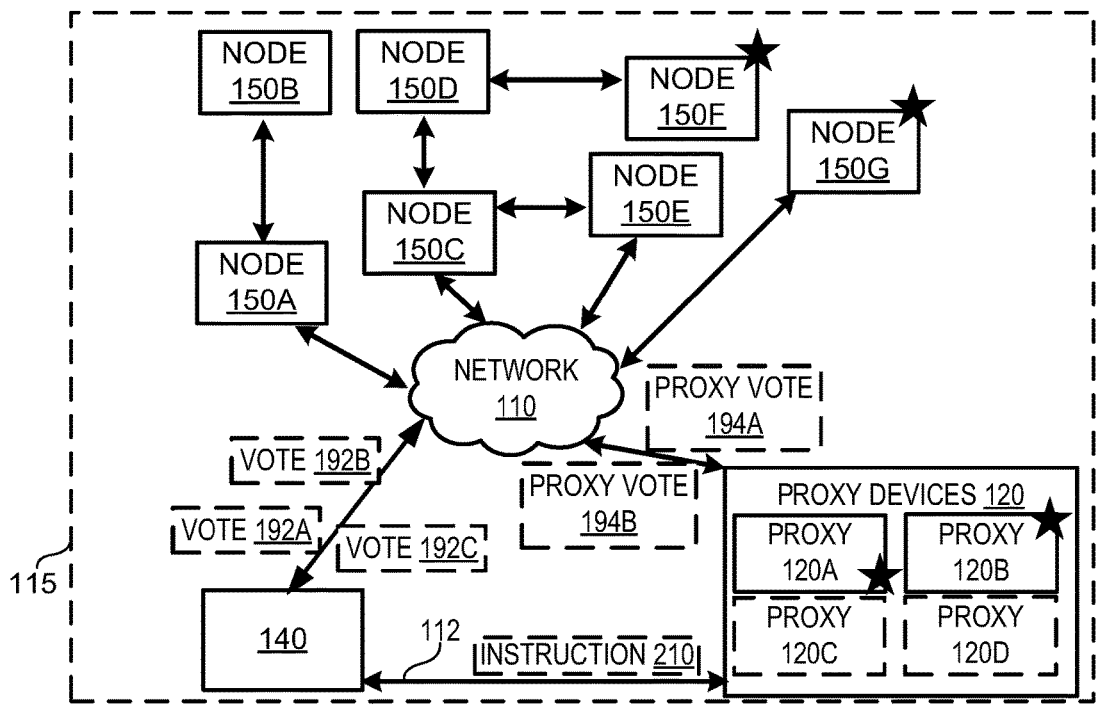
FIG. 2 is a schematic diagram illustrating an example scenario of an activation of one or more proxy devices, in accordance with one or more aspects of the present disclosure.

FIG. 2 is a schematic diagram illustrating an example scenario of an activation of one or more proxy devices 120, in accordance with one or more aspects of the present disclosure. In FIG. 2, an administration device 140 is illustrated in communication with a mesh network 115. The mesh network 115 may include a plurality of node devices 150 (e.g., node devices 150A-150G). As described herein, the plurality of node devices 150 may be coupled directly and/or indirectly within the mesh network 115. The plurality of node devices 150 may each include one or more network interfaces (e.g., network interfaces 180 in FIG. 1). In FIG. 2, one or more of the node devices 150 may be running a service, such as a web server service and/or a blockchain service. As illustrated in FIG. 2, various ones of the node devices 150 may be interconnected with one another and, in some embodiments, one or more of the node devices 150 may relay network transmissions of others of the node devices 150. For example, in the example of FIG. 2, the node device 150D may relay transmissions from the node device 150F to the network 110.

Referring to FIGS. 1 and 2, the administration device 140 may execute a proxy monitor 162 (see FIG. 1) that monitors a state of the node devices 150 and whether a consensus operation has proceeded. For example, the administration device 140 may monitor the node devices 150 to determine if one or more of the node devices 150 has gone offline. In the scenario illustrated in FIG. 2, the administration device 140 may detect that two node devices 150 are offline or otherwise non-responsive: node device 150F and node device 150G. The administration device 140 may detect the node devices 150 are offline by failing to receive responses from queries to the node devices 150, failing to receive a heartbeat signal from the node device 150, querying neighbor node devices 150, or other techniques understood by those of ordinary skill in the art. In some embodiments, the administration device 140 may monitor the number of node devices 150 that are offline to determine if the number of offline node devices 150 exceeds a particular threshold, such as 25% of the available node devices 150, 30% of the available node devices 150, or other threshold value.

The administration device 140 may determine that a consensus operation has begun. In some embodiments, the consensus operation may be announced via a transmission on the mesh network 115. In some embodiments, the administration device 140 may detect the votes 192 associated with the consensus operation on the mesh network 115.

The administration device 140 may activate one or more proxy devices 120 responsive to the consensus operation and/or responsive to determining that a threshold number of node devices 150 have been removed from the mesh network 115, and may map one or more of the proxy devices 120 to the absent node devices 150. For example, for the scenario illustrated in FIG. 2, the administration device 140 may map a first proxy device 120A to absent/non-responsive node device 150F and a second proxy device 120B to absent/non-responsive node device 150G.

The administration device 140 may continue to monitor votes 192 on the mesh network 115. As illustrated in FIG. 2, the administration device 140 may receive network transmissions including votes 192A, 192B, and 192C from node devices 150A, 150B, and 150C, respectively.

If the administration device 140 determines that a threshold number of votes 192 have been received, the administration device 140 may form a consensus instruction 210 from the received votes 192. The consensus instruction 210 may indicate whether the consensus operation should be approved or disapproved. For example, if a majority of the received votes 192 indicate that the consensus operation should be approved, the consensus instruction 210 may indicate approval (e.g., a "yes" vote). Similarly, if less than a majority of the received votes 192 indicate that the consensus operations should be approved, the consensus instruction 210 may indicate disapproval (e.g., a "no" vote).

The administration device 140 may transmit the consensus instructions 210 to one or more of the plurality of node devices 120 that are mapped to inactive/absent node devices 150. For example, the administration device 140 may transmit the consensus instructions 210 over an administrative network 112, which may be a secured network.

The activated proxy devices 120 (e.g., proxy devices 120A and 120B in the example of FIG. 2) may receive the consensus instructions 210. Responsive to the consensus instructions 210, the proxy devices 120 may provide a proxy vote 194 for the on-going consensus operation. For example, in FIG. 2, proxy device 120A may transmit proxy vote 194A and proxy device 120B may transmit proxy vote 194B to the mesh network 115. As described herein, the proxy votes 194 may be received by other node devices 150 of the mesh network 115 and treated as valid votes for the consensus operation.

In some embodiments, the administration device 140 may continue to monitor the node devices 150 to determine if a node device 150 that was previously identified as unavailable becomes available again. In such a case, the administration device 140 may determine which of the proxy node devices 120 is mapped to the now-available node device 150, and deactivate that proxy node device 120. This may be done to avoid multiple votes (e.g., a vote 192 and a proxy vote 194) that correspond to a same node device 150.

By monitoring the state of the node devices 150 and any on-going consensus operations, the administration device 140 may be able to detect scenarios in which the consensus operation is likely to fail or otherwise be challenged due to the absence of particular node devices 150, even though the absence may be due to normal operations of the node devices 150. By activating and controlling the proxy devices 120, the administration device 140 may support the on-going consensus operation while reducing an impact that the proxy devices 120 and the absent node devices 150 have on the consensus operation.

Though FIG. 2 illustrates an embodiment in which the proxy devices 120 are shown as separate from the administration device 140, this is only for convenience of illustration. In some embodiments, the proxy devices 120 may be executing on the administration device 140. For example, in some embodiments, the proxy devices 120 may be containers (e.g., containerized applications) executing on the administration device 140. In embodiments in which the proxy devices 120 are executing on the administration device 140, the administrative network 112 may be an internal network and/or communication path of the administration device 140.

Figure 3:
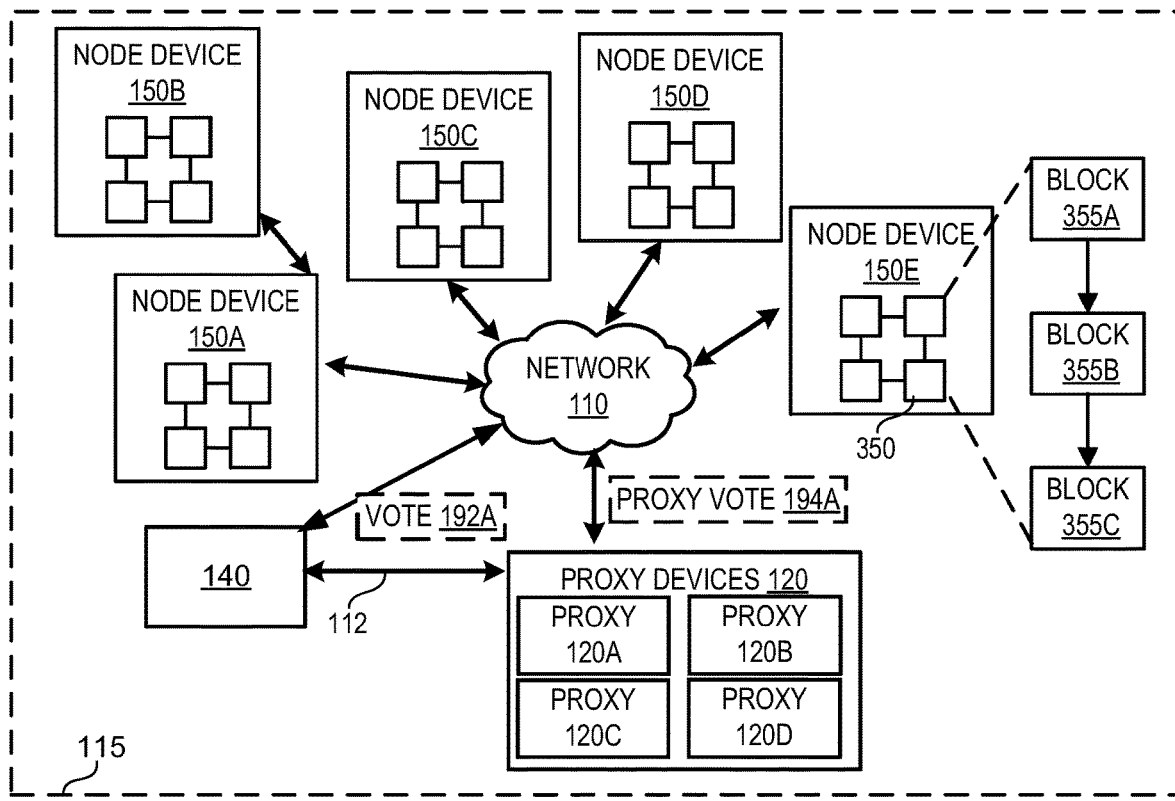
FIG. 3 is a schematic diagram illustrating an example scenario of an activation of one or more proxy devices in a blockchain environment, in accordance with one or more aspects of the present disclosure.

Embodiments of the present disclosure may be useful in multiple scenarios, such as in blockchain environments. FIG. 3 is a schematic diagram illustrating an example scenario of an activation of one or more proxy devices 120 in a blockchain environment, in accordance with one or more aspects of the present disclosure. A description of elements of FIG. 3 that have been previously described will be omitted for brevity.

Referring to FIG. 3, the mesh network 115 may be, or be part of, an implementation of a blockchain 350. A blockchain 350 is a linked list of records 355, often referred to as blocks 355, that are linked together, in part, using cryptography. Each block 355 contains a cryptographic hash of the previous block 355, a timestamp, and transaction data. As blocks 355 each contain information about the block 355 previous to it, they form a chain, with each additional block 355 reinforcing the ones before it. Therefore, blockchains 350 are resistant to modification of their data because once recorded, the data in any given block 355 cannot be altered retroactively without altering all subsequent blocks 355.

Referring to FIGS. 1 and 3, a plurality of node devices 150 may be interconnected and/or grouped into a blockchain 350. Each of the node devices 150 may include a copy of the linked list of the blocks 355 of the blockchain 350. For example, as illustrated in FIG. 3, the blockchain 350 may include node devices 150A, 150B, 150C, 150D, and 150E. The number of node devices 150 in the blockchain 350 illustrated in FIG. 3 is merely an example, and is not intended to limit the embodiments of the present disclosure.

The plurality of node devices 150 may be coupled directly and/or indirectly connected within the mesh network 115. The plurality of node devices 150 may each include one or more network interfaces (e.g., similar to network interfaces 180 in FIG. 1). The node devices 150 are connected in a non-hierarchical peer-to-peer network as part of the blockchain 350.

In some embodiments, the blockchain 350 may be provided as a distributed ledger that may be managed by a peer-to-peer network, such as mesh network 115, where node devices 150 collectively adhere to a protocol to communicate and validate new blocks 355. The blockchain 350 may include a plurality of linked blocks 355. Each of the node devices 150 may include a copy of the linked list of blocks 355 of the block chain 350. For example, as illustrated in FIG. 3, the blockchain 350 may include blocks 355A, 355B, and 355C. The number of blocks 355 in the blockchain 350 illustrated in FIG. 3 is merely an example, and is not intended to limit the embodiments of the present disclosure.

The various node devices 150 of the mesh network 115 may use consensus, such as consensus votes 192 to validate whether a new block 355 may be added to the blockchain 350. The consensus votes 192 may be used to determine whether the new block 355 is valid. For example, a consensus algorithm may be used to allow all of the node devices 150 of the blockchain 350 to reach a common agreement about the present state of the distributed ledger. In this way, consensus algorithms achieve reliability in the blockchain 350. For example, the consensus algorithm ensures that every new block 355 that is added to the blockchain 350 is agreed upon by a subset of the node devices 150 in the blockchain 350 to be valid. In some embodiments, the subset may be all, some, or a majority of the node devices 150 of the blockchain 350, but is typically greater than 50%.

In some embodiments, the common agreement about the present state of the blockchain 350, including common agreement to add a new block 355 to the blockchain 350 may be a consensus operation in which the embodiments of the present disclosure may be employed. For example, an operation to add a new block 355 to the blockchain 350 may spawn a vote among members of the blockchain 350. Each of the members (e.g., the node devices 150) of the blockchain 350 may transmit their vote 192 as to the addition of the new block 355 to the other members (e.g., the other node devices 150) of the blockchain 350. The administration device 140 may monitor the vote (e.g., by receiving votes 192 transmitted by the node devices 150).

As previously described with respect to FIGS. 1 and 2, the administration device 140 may also monitor the status of the node devices 150 of the blockchain 350. Upon determining that a threshold number of node devices 150 have become unavailable (e.g., one node device 150, greater than 25% of the node devices 150, greater than 30% of the node devices 150, etc.), the administration device 140 may activate one or more of the proxy devices 120. The administration device 140 may maintain a mapping between the activated proxy devices 120 and the disabled/unavailable node devices 150 which they are intended to represent. As described herein, activating a node device 120 may include executing a containerized application, executing a virtual machine, and/or activating a spare node device 120. In some embodiments, as part of activating the proxy device 120, the administration device 140 may raise a special transaction request of the blockchain 350, which may be transmitted to the node devices 150 of the blockchain 350, to allow the proxy device 120 to become a peer on the blockchain 350. In some embodiments, the request to add the proxy device 120 as a peer may be accompanied by an audit record that indicates the proxy device 120 is a transient addition to the blockchain 350 due to an offline node device 150. This audit record may allow the addition of the proxy device 120 to be performed in a transparent and open manner than can be documented by an audit of the blockchain 350.

Once the proxy devices 120 are accepted as part of the blockchain 350, the vote of the proxy device 120 may be controlled by the administration device 140 as described with respect to FIGS. 1 and 2. For example, the administration device 140 may monitor the votes 192 of the node devices 150 of the blockchain 350, such as vote 192A of node device 150A illustrated in FIG. 3, to determine the status of the consensus operation. Based on the status of the consensus operation (e.g., by monitoring whether a consensus is forming among the voting node devices 150 based on the votes 192 received/monitored by the administration device 140), the administration device 140 may provide instructions (e.g., consensus instructions 210 of FIG. 2) to the activated proxy device(s) 120 to direct their proxy vote 194, such as proxy vote 194A of proxy device 120A illustrated in FIG. 3.

By utilizing the proxy devices 120, the administration device 140 may allow for a consensus operation, such as the addition of a new block 355 to the blockchain 350, to proceed despite the transient nature of the node devices 150 that may be included in the blockchain 350. This allows for a more robust and resilient blockchain 350 that may allow the incorporation of new types of node devices 150 while maintaining the integrity of the blockchain 350.

Figure 4:
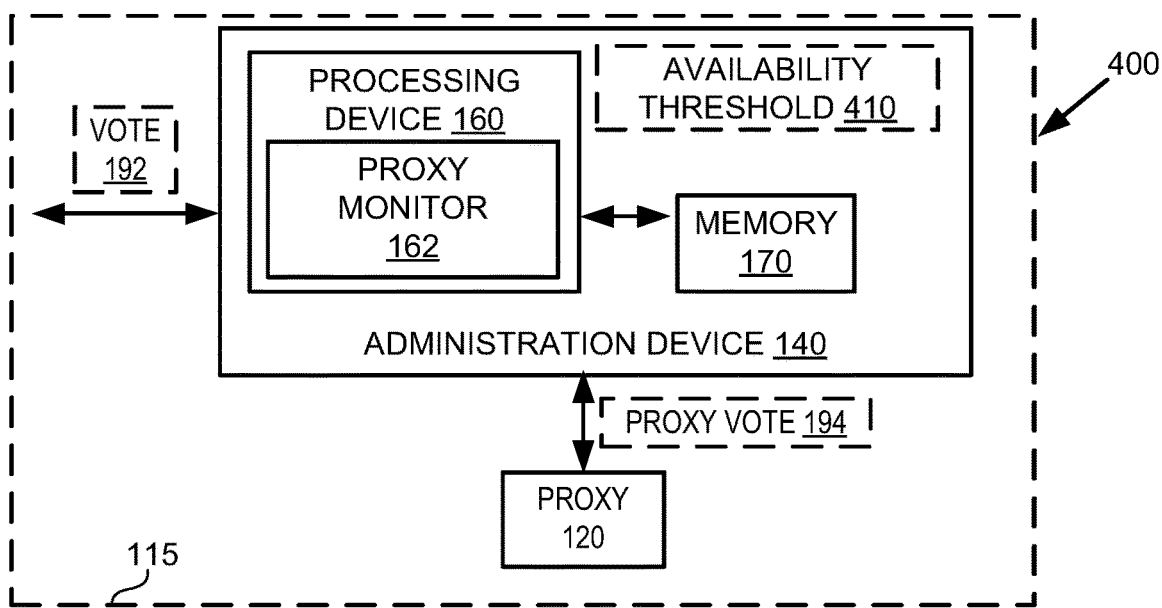
FIG. 4 is a component diagram of an example of a device architecture, in accordance with one or more aspects of the disclosure.

FIG. 4 is a component diagram of an example of a device architecture 400, in accordance with one or more aspects of the disclosure. The device architecture 400 includes administration device 140, processing device 160, and memory 170 of FIG. 1 and, as such, a duplicate description thereof will be omitted.

A proxy monitor 162 of the administration device 140 may monitor a plurality of node devices 150 described herein with respect to FIGS. 1-3. The administration device 140 may detect, e.g., by the processing device 160, the availability of the node devices 150 of a mesh network 115 to determine if one or more of the node devices 150 has become unavailable. A node device 150 may be considered unavailable, for example, if the node device 150 is not responding to network communications from the administration device 140 and/or other node devices 150 of the mesh network 115.

The administration device 140 may determine (e.g., by the proxy monitor 162) that a number of the node devices 150 that are unavailable has exceeded an availability threshold 410. Responsive to detecting that the availability threshold 410 has been exceeded, the administration device 140 may activate one or more proxy devices 120 to correspond the one or more node devices 150 that have been detected as being unavailable.

The administration device 140 may monitor and/or detect a consensus operation on the mesh network 115. Detecting the consensus operation may include detecting one or more vote transmissions 192 on the mesh network 115. Responsive to detecting the consensus operation, the administration device 140 may control the proxy device 120 to provide a proxy vote transmission 194 to the mesh network 115. In some embodiments, the contents of the proxy vote transmission 194 (e.g., whether to approve or disapprove) may be based on the vote transmissions 192 monitored by the administration device 140. For example, the administration device 140 may direct the proxy device 120 to provide a proxy vote transmission 194 that is in accordance with a consensus of the vote transmissions 192 observed by the administration device 140.

Administration device 140 may include a memory 170 that is operatively coupled to processing device 160. In some embodiments, memory 170 may include volatile memory devices (e.g., random access memory (RAM)), non-volatile memory devices (e.g., flash memory) and/or other types of memory devices.

Figure 5:
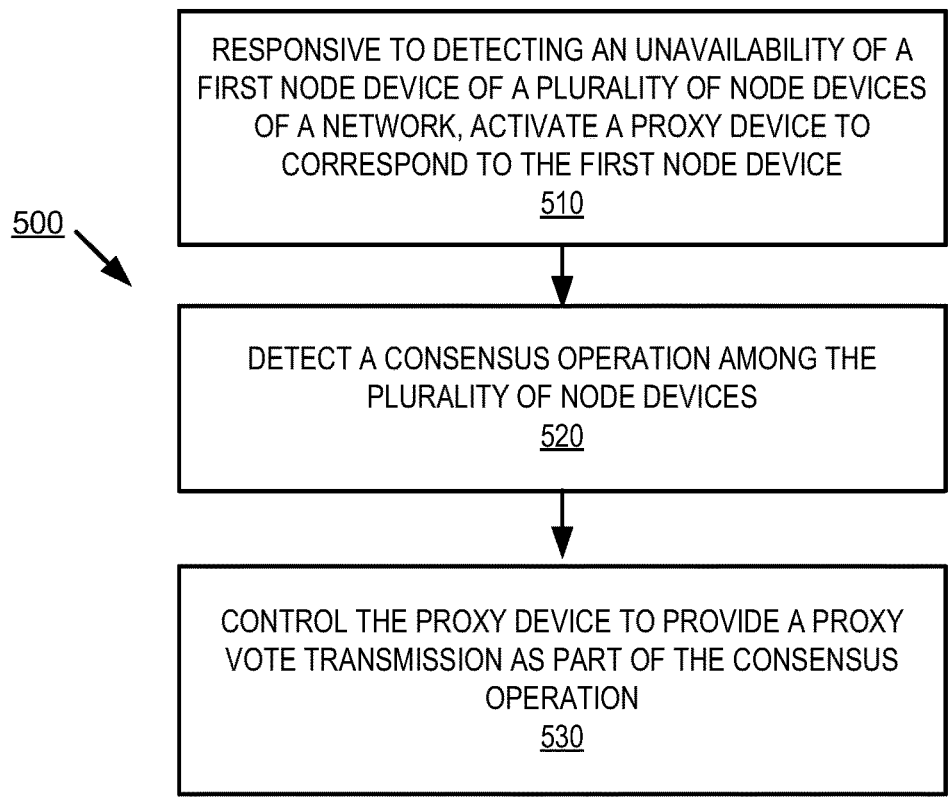
FIG. 5 is a flow diagram of a method of monitoring a consensus operation of a mesh network, in accordance with one or more aspects of the disclosure.

FIG. 5 is a flow diagram of a method 500 of monitoring a consensus operation of a mesh network 115, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by administration device 140 and/or the proxy monitor 162 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic, responsive to detecting an unavailability of a first node device of a plurality of node devices of a network, activates a proxy device to correspond to the first node device. The plurality of node devices may be, for example, similar to the node devices 150 discussed herein with respect to FIGS. 1-4. The network may be, for example, similar to mesh network 115 discussed herein with respect to FIGS. 1-4. The proxy device may be, for example, similar to proxy device 120 discussed herein with respect to FIGS. 1-4. In some embodiments, activating the proxy device may be accompanied by transmitting a transaction request on the network that indicates the proxy device corresponds to the first node device.

In some embodiments, detecting the unavailability of the first node device may include attempting to contact the first node device over the network, or querying a status of the first node device from one or more of the plurality of node devices. In some embodiments, activating the proxy device may be performed responsive to determining that a number of the plurality of node devices that are unavailable exceeds a defined availability threshold, such as availability threshold 410 discussed herein with respect to FIGS. 1-4. In some embodiments, the defined availability threshold may be greater than twenty-five percent of the plurality of node devices. In some embodiments, activating the proxy device may be performed responsive to determining that a duration that the first node device has been unavailable has exceed a defined time duration.

At block 520, the processing logic, detects a consensus operation among the plurality of node devices. The consensus operation may include a plurality of vote transmissions within the network. The vote transmission may be, for example, similar to the votes 192 discussed herein with respect to FIGS. 1-4. In some embodiments, the network may be or include a blockchain and the consensus operation may be to an operation to add a block to the blockchain, such as that discussed herein with respect to blockchain 350 and block 355 of FIG. 3. In some embodiments, detecting the consensus operation among the plurality of node devices includes examining an approval status of each of the plurality of vote transmissions.

At block 530, the processing logic controls the proxy device to provide a proxy vote transmission as part of the consensus operation. The proxy vote transmission may be similar to proxy vote 194 discussed herein with respect to FIGS. 1-4. In some embodiments, controlling the proxy device includes transmitting a proxy vote transmission comprising an approval of the consensus operation if a count of the plurality of vote transmissions received and/or monitored by the processing logic that indicate approval exceeds a defined vote threshold and transmitting a proxy vote transmission comprising a disapproval of the consensus operation if the count of the plurality of vote transmissions received and/or monitored by the processing logic that indicate approval does not exceed the defined vote threshold.

As described herein, an administration device 140 may monitor a mesh network 115 to determine if one or more of the node devices 150 have become unavailable. The administration device 150 may determine the status of the node device 150 directly (e.g., by attempting a communication or other interaction and waiting for a response), but the embodiments of the present disclosure are not limited thereto. In some embodiments, the administration device 140 may additionally, or alternatively, query others of the node devices 150 to determine the status of a particular node device.

Figure 6A:
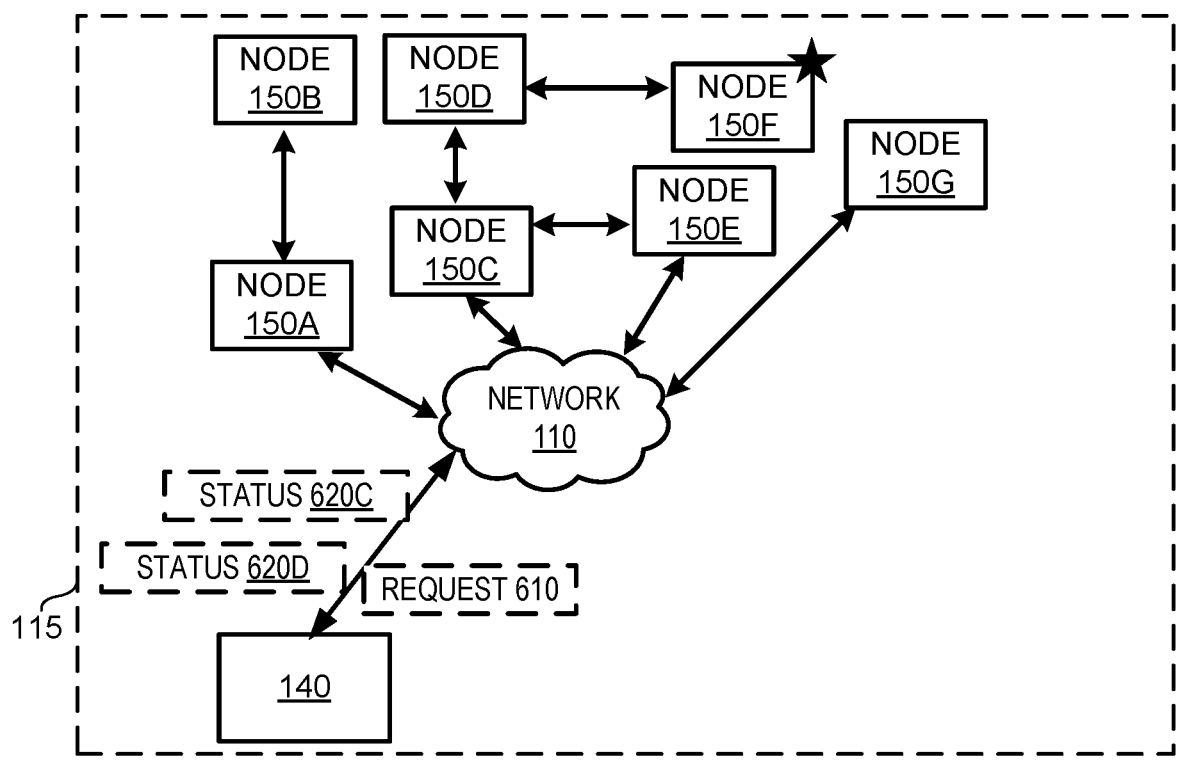
FIGS. 6A and 6B are schematic views of a mesh network that illustrate scenarios for determining the availability of a node device, in accordance with some embodiments of the present disclosure.
Figure 6B:
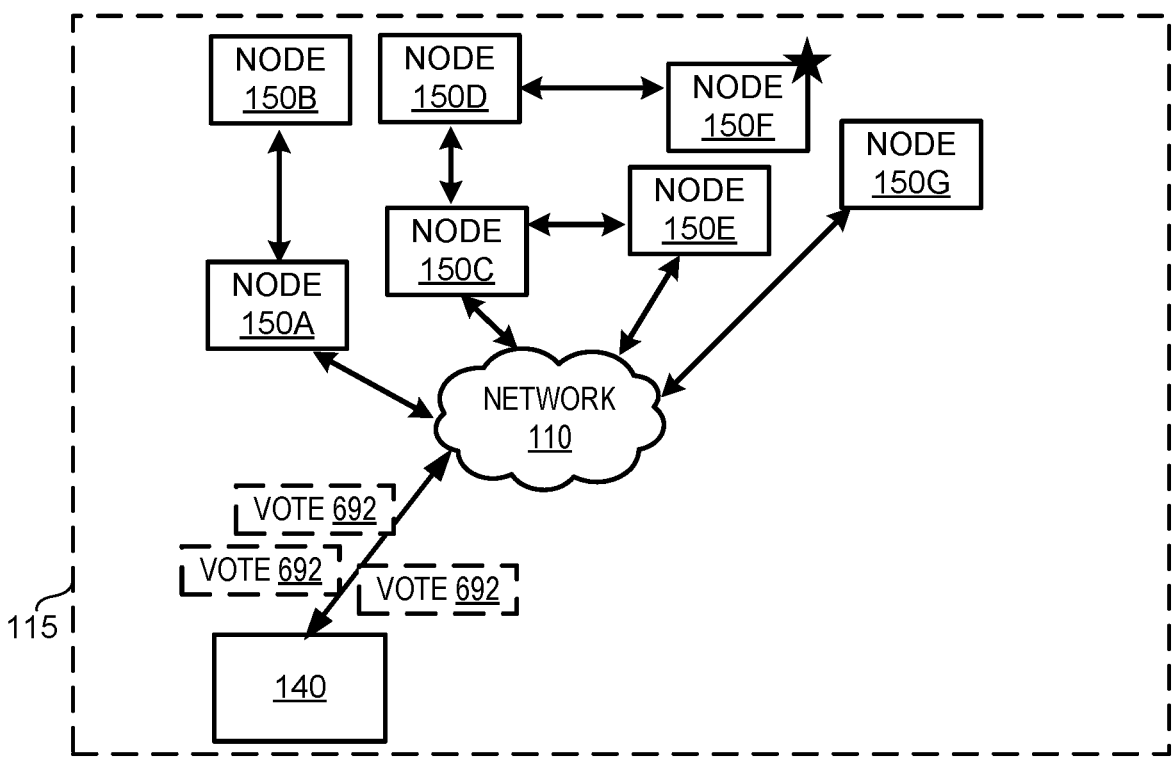

FIGS. 6A and 6B are schematic views of a mesh network 115 that illustrate scenarios for determining the availability of a node device 150, in accordance with some embodiments of the present disclosure. The mesh network 115 of FIG. 6 includes administration device 140, node devices 150, and network 110 of FIG. 1 and, as such, a duplicate description thereof will be omitted.

Referring to FIG. 6, the interconnected nature of the mesh network 115 may provide various paths with which the administration device 140 may communicate with a given node device 150. In the example of FIG. 6, a node device 150F is illustrated as having a connection to the administration device 140 through other node devices 150C, 150D. As an example, a first node device 150C may have a wireless (e.g., WIFI) or wired network connection to network 110, and a second node device 150D may have a wired or wireless connection to the first node device 150. For example, the second node device 150D may be connected to the first node device 150C via a wireless protocol, such as Bluetooth. Similarly, a third node device 150F may have a wired or wireless connection to the second node device 150D.

In some embodiments, administration device 140 may communicate, or attempt to communicate, with the third node device 150F by relaying messages between the first and second node devices 150C, 150D. If the third node device 150F fails to respond to the administration device 140, the third node device 150F may be marked as unavailable. In some embodiments, the administration device 140 may broadcast or otherwise transmit a status request 610 on the mesh network 115. The node devices 150 may respond with their particular status by transmitting a response status message 620. For example, as illustrated in FIG. 6A, the first node device 150C and the second node device 150D may provide or otherwise transmit status messages 620C and 620D, respectively, in response to the request message 610. The administration device 150 may infer, based on a lack of status message 620, that the third node device 150F is unavailable.

In some embodiments, the administration device 140 may determine the availability of the third node device 150 by querying the other node devices 150. For example, the administration device 140 may propagate or otherwise broadcast the request 610 to the node devices 150 to request an update on the status of the third node device 150F. The request may provide an address (e.g., an IP address or MAC address) or other identifying information of the third node device 150F. The node devices 150 may respond with status messages 620 as in the prior example, but the status messages 620 may include the status of the third node device 150F. For example, both the first node device 150C and the second node device 150D may attempt to communicate with the third node device 150F, and may provide the results of their attempts (e.g., as to whether the third node device 150F is available or unavailable) via status messages 620C and 620D, respectively. The administration device 140 may analyze the status messages 620 to determine if the node device 150 (e.g., the third node device 150F) is available and/or responsive. In some embodiments, the administration device 140 may weigh a response from a node device 150 that is fewer network hops away from the node device 150 in question higher than status messages 620 provided from node devices 150 that are further away. In the example illustrated in FIG. 6B, the administration device 140 may weigh the status message 620D from the third node device 150D higher in its analysis than the status message 620C from the second node device 150C. For example, if the second node device 150C indicates that the third node device 150F is non-responsive and/or unavailable, but the third node device 150D indicates that the third node device 150F is responsive and/or available, the administration device 140 may determine that the third node device 150F is responsive and/or available.

In some embodiments, determining the availability of a node device 150 itself may be performed as a consensus operation. For example, as illustrated in FIG. 6B, the administration device 140 may request a consensus operation from the node devices 150 as to whether the third node device 150F is available for participation in the mesh network 115. Each of the individual node devices 150 may make their own individual determination (e.g., by performing their own attempts to contact the node device 150 in question), and respond to the consensus operation with a vote transmission 692. The administration device 140 may review the vote transmissions 692 to determine if there is a consensus that a node device 150 (e.g., the third node devices 150F in FIG. 6B) is unavailable. If the node devices 150 of the mesh network 115 reach a consensus that the node device 150 in question (e.g., the third node devices 150F in FIG. 6B) is unavailable (e.g., a majority of the node devices 150 agree that the node device 150 in question is unavailable), the administration device 140 can proceed with determining whether a proxy device 120 should be activated, as described herein. For some embodiments, such as the blockchain embodiments described herein for example, the consensus operation that the node device 150 is unavailable may be saved for auditing purposes (e.g., as part of the blockchain). In this way, the reasons for the activation of the proxy device 120 are transparent. For example, in some embodiments, the node devices 150 of the mesh network 115 may require a consensus operation to agree that a node device 150 is unavailable before one or more proxy devices 120 may be added to the mesh network 115 for the purposes of voting in further consensus operations.

Figure 7:
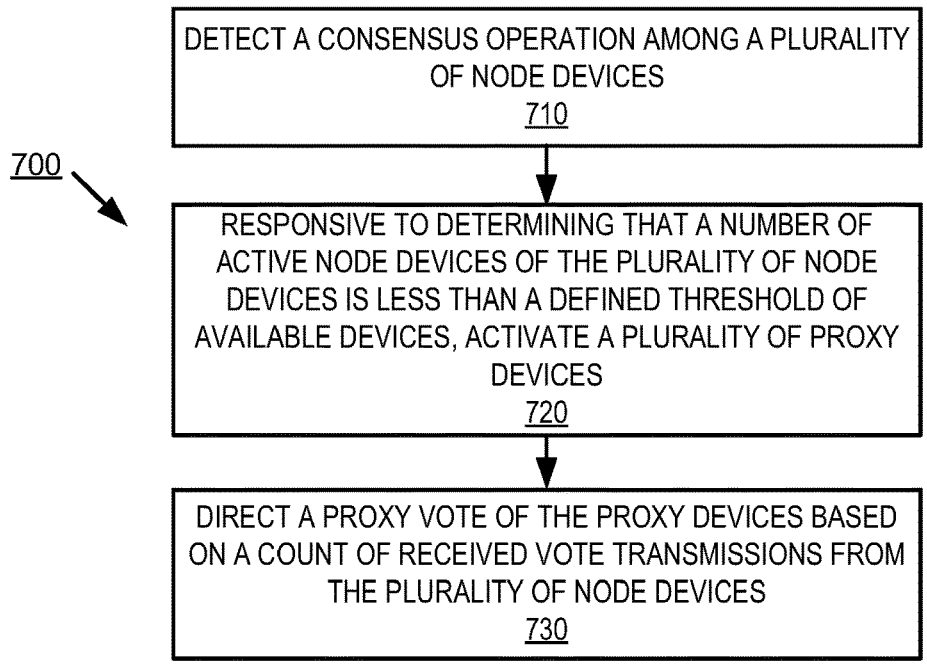
FIG. 7 is a flow diagram of a method of monitoring a consensus operation of a mesh network, in accordance with one or more aspects of the disclosure.

FIG. 7 is a flow diagram of a method 700 of monitoring a consensus operation of a mesh network 115, in accordance with one or more aspects of the disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by administration device 140 and/or the proxy monitor 162 of at least FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic detects a consensus operation among a plurality of node devices. The plurality of node devices may be, for example, similar to the node devices 150 discussed herein with respect to FIGS. 1-4. The network may be, for example, similar to mesh network 115 discussed herein with respect to FIGS. 1-4. In some embodiments, activating the proxy device may be accompanied by transmitting a transaction request on the network that indicates the proxy device corresponds to the first node device.

The consensus operation may include a plurality of vote transmissions within the network. The vote transmission may be, for example, similar to the votes 192 discussed herein with respect to FIGS. 1-4. In some embodiments, the network may be or include a blockchain and the consensus operation may be to an operation to add a block to the blockchain, such as that discussed herein with respect to blockchain 350 and block 355 of FIG. 3. In some embodiments, detecting the consensus operation among the plurality of node devices includes examining an approval status of each of the plurality of vote transmissions.

At block 720, the processing logic, responsive to determining that a number of active node devices of the plurality of node devices is less than a defined threshold of available devices, activates a plurality of proxy devices. The proxy device may be, for example, similar to proxy device 120 discussed herein with respect to FIGS. 1-4. In some embodiments, activating the proxy device may be accompanied by transmitting a transaction request on the network that indicates the proxy device corresponds to the first node device.

In some embodiments, detecting the unavailability of the first node device may include attempting to contact the first node device over the network, or querying a status of the first node device from one or more of the plurality of node devices. In some embodiments, the defined threshold of the available devices may be less than seventy-five percent of the plurality of node devices. In some embodiments, activating the proxy device may be performed responsive to determining that a duration of unavailability of the first node device has exceed a defined time duration.

At block 730, the processing logic directs a proxy vote of the proxy devices based on a count of received vote transmission from the plurality of node devices. The proxy vote may be similar to proxy vote 194 discussed herein with respect to FIGS. 1-4. In some embodiments, directing the proxy device includes transmitting instructions to the proxy device to transmit a proxy vote transmission comprising an approval of the consensus operation if a count of the plurality of vote transmissions that indicate approval exceeds a defined vote threshold and transmitting instructions to the proxy device to transmit a proxy vote transmission comprising a disapproval of the consensus operation if the count of the plurality of vote transmissions that indicate approval does not exceed the defined vote threshold.

Figure 8:
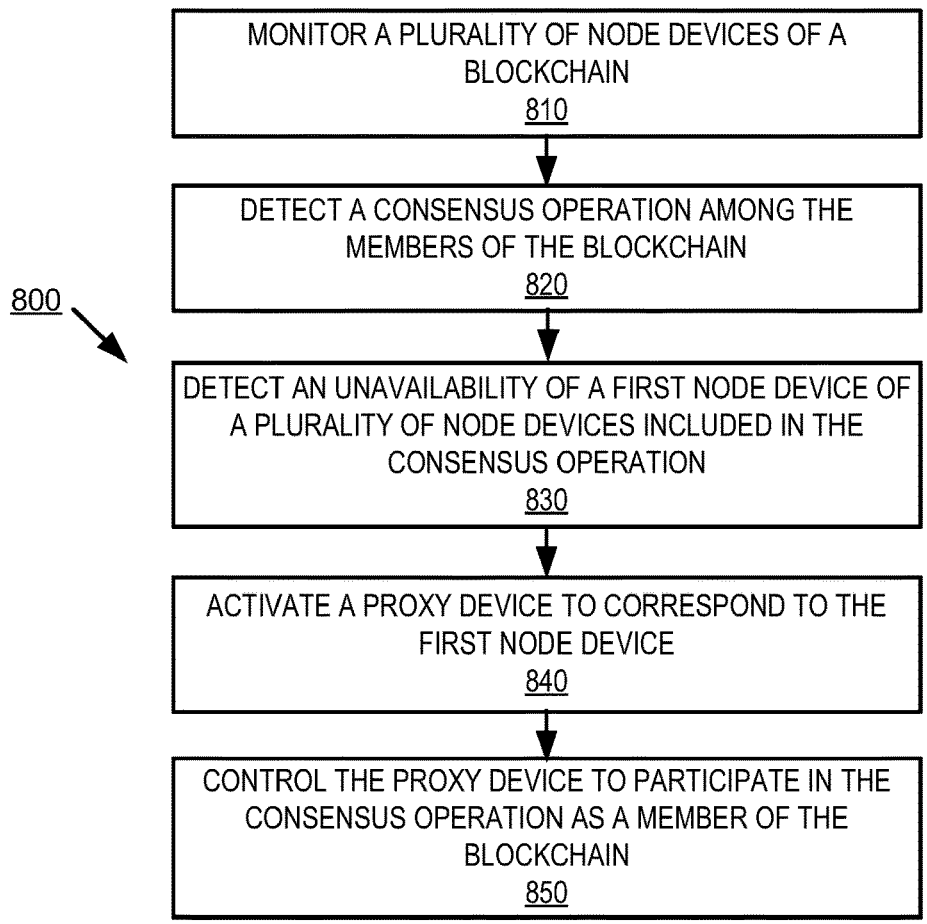
FIG. 8 is a flow diagram of a method of monitoring a consensus operation of a mesh network, in accordance with one or more aspects of the disclosure.

FIG. 8 is a flow diagram of a method 800 of monitoring a consensus operation of a mesh network 115, in accordance with one or more aspects of the disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by administration device 140 and/or the proxy monitor 162 of at least FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic monitors a plurality of node devices of a blockchain. The plurality of node devices may be, for example, similar to the node devices 150 discussed herein with respect to FIGS. 1-4. The blockchain may be, for example, similar to blockchain 350 discussed herein with respect to FIG. 3.

At block 820, the processing logic detects a consensus operation among the members of the blockchain. The consensus operation may include a plurality of vote transmissions within the network. The vote transmission may be, for example, similar to the votes 192 discussed herein with respect to FIGS. 1-4. In some embodiments, detecting the consensus operation among the plurality of node devices includes examining an approval status of each of the plurality of vote transmissions.

At block 830, the processing logic detects an unavailability of a first node device of a plurality of node devices included in the consensus operation. In some embodiments, detecting the unavailability of the first node device may include attempting to contact the first node device over the network, or querying a status of the first node device from one or more of the plurality of node devices.

At block 840, the processing logic activates a proxy device to correspond to the first node device. In some embodiments, activating the proxy device may be performed responsive to determining that a number of the plurality of node devices that are unavailable exceeds a defined availability threshold, such as availability threshold 410 discussed herein with respect to FIGS. 1-4. In some embodiments, the defined availability threshold may be greater than twenty-five percent of the plurality of node devices. In some embodiments, activating the proxy device may be performed responsive to determining that the unavailability of the first node device has exceed a defined time duration.

At block 850, the processing logic controls the proxy device to participate in the consensus operation as a member of the blockchain. The proxy vote transmission may be similar to proxy vote 194 discussed herein with respect to FIGS. 1-4. In some embodiments, controlling the proxy device includes directing the proxy device to transmit a proxy vote transmission comprising an approval of the consensus operation if a count of the plurality of vote transmissions that indicate approval exceeds a defined vote threshold and directing the proxy device to transmit a proxy vote transmission comprising a disapproval of the consensus operation if the count of the plurality of vote transmissions that indicate approval does not exceed the defined vote threshold.

Figure 9:
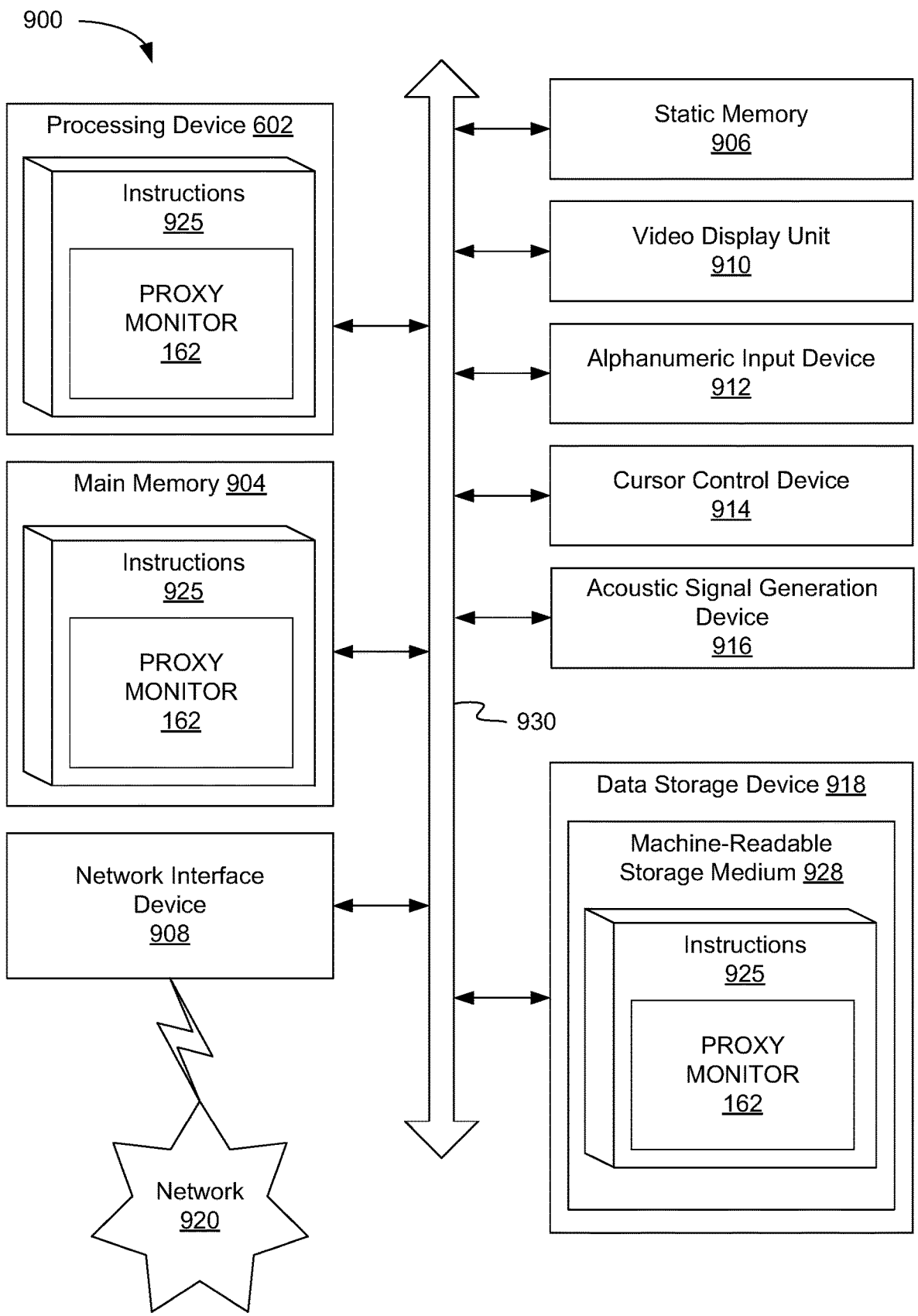
FIG. 9 is a block diagram of an example computing device that may perform one or more of the operations described herein, in accordance with one or more aspects of the disclosure.

FIG. 9 is a block diagram of an example computing device 900 that may perform one or more of the operations described herein, in accordance with one or more aspects of the disclosure. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also include one or more special-purpose processing devices such as an application specific integrated circuit (ASIC), a field programmable gate array (FPGA), a digital signal processor (DSP), network processor, or the like. The processing device 902 may execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a network monitoring component, e.g., proxy monitor 162 for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: responsive to detecting an unavailability of a first node device of a plurality of node devices of a network, activating a proxy device to correspond to the first node device; detecting a consensus operation among the plurality of node devices, wherein the consensus operation comprises a plurality of vote transmissions within the network; and controlling, by a processing device, the proxy device to provide a proxy vote transmission as part of the consensus operation.

Example 2 is the method of Example 1, wherein the network comprises a blockchain and the consensus operation comprises an operation to add a block to the blockchain.

Example 3 is the method of any of Examples 1-2, wherein activating the proxy device is performed further responsive to determining that a number of the plurality of node devices that have been detected as being unavailable exceeds a defined availability threshold.

Example 4 is the method of any of Examples 1-3, wherein the defined availability threshold is greater than twenty-five percent of the plurality of node devices.

Example 5 is the method of any of Examples 1-4, wherein detecting the consensus operation among the plurality of node devices comprises examining an approval status of each of the plurality of vote transmissions.

Example 6 is the method of any of Examples 1-5, wherein controlling the proxy device to provide the proxy vote transmission as part of the consensus operation comprises: responsive to determining that a count of the plurality of vote transmissions that indicate approval exceeds a defined vote threshold, transmitting instructions to the proxy device to transmit a proxy vote transmission comprising an approval of the consensus operation; and responsive to determining that the count of the plurality of vote transmissions that indicate approval does not exceed the defined vote threshold, transmitting instructions to the proxy device to transmit a proxy vote transmission comprising a disapproval of the consensus operation.

Example 7 is the method of any of Examples 1-6, further comprising transmitting a transaction request on the network that indicates the proxy device corresponds to the first node device.

Example 8 is the method of any of Examples 1-7, wherein the defined vote threshold is greater than fifty percent of the plurality of vote transmissions.

Example 9 is the method of any of Examples 1-8, wherein activating the proxy device is performed further responsive to determining that the unavailability of the first node device has exceed a defined time duration.

Example 10 is the method of any of Examples 1-9, further comprising transmitting a transaction request on the network that indicates the proxy device corresponds to the first node device.

Example 11 is the method of any of Examples 1-10, wherein detecting the unavailability of the first node device comprises querying a status of the first node device from one or more of the plurality of node devices.

Example 12 is the method of any of Examples 1-11, further comprising, responsive to determining that the first node device is available, deactivating the proxy device.

Example 13 is a system comprising: a memory; and a processing device operatively coupled to the memory, to: responsive to detecting an unavailability of a first node device of a plurality of node devices of a network, activate a proxy device to correspond to the first node device; detect a consensus operation among the plurality of node devices, wherein the consensus operation comprises a plurality of vote transmissions within the network; and control the proxy device to provide a proxy vote transmission as part of the consensus operation.

Example 14 is the system of Example 13, wherein the network comprises a blockchain and the consensus operation comprises an operation to add a block to the blockchain.

Example 15 is the system of any of Examples 13-14, wherein the processing device is to activate the proxy device further responsive to determining that a number of the plurality of node devices that have been detected as being unavailable exceeds a defined availability threshold.

Example 16 is the system of any of Examples 13-15, wherein the defined availability threshold is greater than twenty-five percent of the plurality of node devices.

Example 17 is the system of any of Examples 13-16, wherein, to detect the consensus operation among the plurality of node devices, the processing device is to examine an approval status of each of the plurality of vote transmissions.

Example 18 is the system of any of Examples 13-17, wherein to control the proxy device to provide the proxy vote transmission as part of the consensus operation the processing device is to: responsive to determining that a count of the plurality of vote transmissions that indicate approval exceeds a defined vote threshold, transmit instructions to the proxy device to transmit a proxy vote transmission comprising an approval of the consensus operation; and responsive to determining that the count of the plurality of vote transmissions that indicate approval does not exceed the defined vote threshold, transmit instructions to the proxy device to transmit a proxy vote transmission comprising a disapproval of the consensus operation.

Example 19 is the system of any of Examples 13-18, wherein the processing device is further to transmit a transaction request on the network that indicates the proxy device corresponds to the first node device.

Example 20 is the system of any of Examples 13-19, wherein detecting the unavailability of the first node device comprises querying a status of the first node device from one or more of the plurality of node devices.

Example 21 is the system of any of Examples 13-20, wherein the processing device is further to, responsive to determining that the first node device is available, deactivating the proxy device.

Example 22 is a non-transitory computer-readable storage medium including instructions that, when executed by a processing device, cause the processing device to: responsive to detecting an unavailability of a first node device of a plurality of node devices of a network, activate a proxy device to correspond to the first node device; detect a consensus operation among the plurality of node devices, wherein the consensus operation comprises a plurality of vote transmissions within the network; and control, by the processing device, the proxy device to provide a proxy vote transmission as part of the consensus operation.

Example 23 is the non-transitory computer-readable storage medium of Example 22, wherein the network comprises a blockchain and the consensus operation comprises an operation to add a block to the blockchain.

Example 24 is the non-transitory computer-readable storage medium of any of Examples 22-23, wherein the processing device is to activate the proxy device further responsive to determining that a number of the plurality of node devices that have been detected as being unavailable exceeds a defined availability threshold.

Example 25 is the non-transitory computer-readable storage medium of any of Examples 22-24, wherein to perform the remediation on the object repository, the processing device is to lock the object repository for further write access.

Example 26 is the non-transitory computer-readable storage medium of any of Examples 22-25, wherein, to detect the consensus operation among the plurality of node devices, the processing device is to examine an approval status of each of the plurality of vote transmissions.

Example 27 is the non-transitory computer-readable storage medium of any of Examples 22-26, wherein to control the proxy device to provide the proxy vote transmission as part of the consensus operation the processing device is to: responsive to determining that a count of the plurality of vote transmissions that indicate approval exceeds a defined vote threshold, transmit instructions to the proxy device to transmit a proxy vote transmission comprising an approval of the consensus operation; and responsive to determining that the count of the plurality of vote transmissions that indicate approval does not exceed the defined vote threshold, transmit instructions to the proxy device to transmit a proxy vote transmission comprising a disapproval of the consensus operation.

Example 28 is the non-transitory computer-readable storage medium of any of Examples 22-27, wherein the processing device is further to transmit a transaction request on the network that indicates the proxy device corresponds to the first node device.

Example 29 is the non-transitory computer-readable storage medium of any of Examples 22-28, wherein detecting the unavailability of the first node device comprises querying a status of the first node device from one or more of the plurality of node devices.

Example 30 is the non-transitory computer-readable storage medium of any of Examples 22-29, wherein the processing device is further to, responsive to determining that the first node device is available, deactivating the proxy device.

Example 31 is a system comprising: a memory; and a processing device operatively coupled to the memory, to: detect a consensus operation among a plurality of node devices; responsive to determining that a number of active node devices of the plurality of node devices is less than a defined threshold of available devices, activate a plurality of proxy devices; and direct a proxy vote of the proxy devices based on a count of received vote transmissions from the plurality of node devices.

Example 32 is the system of Example 31, wherein the plurality of node devices form a portion of a blockchain and the consensus operation comprises an operation to add a block to the blockchain.

Example 33 is the system of any of Examples 31-32, wherein the defined threshold of available devices is seventy-five percent or less of the plurality of node devices.

Example 34 is the system of any of Examples 31-33, wherein, to detect the consensus operation among the plurality of node devices, the processing device is to examine an approval status of each of the received vote transmissions.

Example 35 is the system of any of Examples 31-34, wherein to direct the proxy vote of the proxy devices based on the count of the received vote transmissions from the plurality of node devices the processing device is to: responsive to determining that the count of the received vote transmissions that indicate approval exceeds a defined vote threshold, transmit instructions to the proxy devices to each transmit a proxy vote transmission comprising an approval of the consensus operation; and responsive to determining that the count of the received vote transmissions that indicate approval does not exceed the defined vote threshold, transmit instructions to the proxy devices to each transmit a proxy vote transmission comprising a disapproval of the consensus operation.

Example 36 is the system of any of Examples 31-35, wherein the processing device is further to, responsive to determining that one of the plurality of node devices that was previously unavailable is currently available, deactivate one of the plurality of proxy devices.

Example 37 is the system of any of Examples 31-36, wherein the processing device is further to transmit a transaction request that indicates a correspondence between each of the plurality of proxy devices and an inactive one of the plurality of node devices.

Example 38 is the system of any of Examples 31-37, wherein the processing device is further to detect the unavailability of a first node device of the plurality of node devices by querying a status of the first node device from one or more of the plurality of node devices.

Example 39 is an apparatus comprising: means for detecting an unavailability of a first node device of a plurality of node devices of a network responsive to detecting the unavailability of the first node device, means for activating a proxy device to correspond to the first node device; means for detecting a consensus operation among the plurality of node devices, wherein the consensus operation comprises a plurality of vote transmissions within the network; and means for controlling the proxy device to provide a proxy vote transmission as part of the consensus operation.

Example 40 is the apparatus of Example 39, wherein the network comprises a blockchain and the consensus operation comprises an operation to add a block to the blockchain.

Example 41 is the apparatus of any of Examples 39-40, wherein activating the proxy device is performed further responsive to determining that a number of the plurality of node devices that have been detected as being unavailable exceeds a defined availability threshold.

Example 42 is the apparatus of any of Examples 39-41, wherein the defined availability threshold is greater than twenty-five percent of the plurality of node devices.

Example 43 is the apparatus of any of Examples 39-42, wherein detecting the consensus operation among the plurality of node devices comprises means for examining an approval status of each of the plurality of vote transmissions.

Example 44 is the apparatus of any of Examples 39-43, wherein controlling the proxy device to provide the proxy vote transmission as part of the consensus operation comprises: responsive to determining that a count of the plurality of vote transmissions that indicate approval exceeds a defined vote threshold, means for transmitting instructions to the proxy device to transmit a proxy vote transmission comprising an approval of the consensus operation; and responsive to determining that the count of the plurality of vote transmissions that indicate approval does not exceed the defined vote threshold, means for transmitting instructions to the proxy device to transmit a proxy vote transmission comprising a disapproval of the consensus operation.

Example 45 is the apparatus of any of Examples 39-44, further comprising means for transmitting a transaction request on the network that indicates the proxy device corresponds to the first node device.

Example 46 is the apparatus of any of Examples 39-45, wherein the defined vote threshold is greater than fifty percent of the plurality of vote transmissions.

Example 46 is the apparatus of any of Examples 39-46, further comprising means for transmitting a transaction request on the network that indicates the proxy device corresponds to the first node device.

Example 47 is a system comprising: a memory; and a processing device operatively coupled to the memory, to: monitor a plurality of node devices of a blockchain; detect a consensus operation among the members of the blockchain; detect an unavailability of a first node device of a plurality of node devices included in the consensus operation; activate a proxy device to correspond to the first node device; and control the proxy device to participate in the consensus operation as a member of the blockchain.

Example 48 is the system of Example 47, wherein activating the proxy device is performed responsive to determining that a number of the plurality of node devices that have been detected as being unavailable exceeds a defined availability threshold.

Example 49 is the system of any of Examples 47-48, wherein the defined availability threshold is greater than twenty-five percent of the plurality of node devices.

Example 50 is the system of any of Examples 47-49, wherein the consensus operation is associated with an operation to add a block to the blockchain.

Example 51 is the system of any of Examples 47-50, wherein detecting the consensus operation among the members of the blockchain comprises examining an approval status of each of a plurality of vote transmissions distributed among members of the blockchain.

Example 52 is the system of any of Examples 47-51, wherein controlling the proxy device to participate in the consensus operation as the member of the blockchain comprises: responsive to determining that a count of a plurality of vote transmissions of the consensus operation that indicate approval exceeds a defined vote threshold, transmitting instructions to the proxy device to transmit a proxy vote transmission comprising an approval of the consensus operation; and responsive to determining that the count of the plurality of vote transmissions of the consensus operation that indicate approval does not exceed the defined vote threshold, transmitting instructions to the proxy device to transmit a proxy vote transmission comprising a disapproval of the consensus operation.

Example 53 is the system of any of Examples 47-52, wherein the processing device is further to transmit a transaction request to the blockchain that indicates the proxy device corresponds to the first node device.

Example 54 is the system of any of Examples 47-53, wherein detecting the unavailability of the first node device comprises querying a status of the first node device from one or more of the plurality of node devices.

Example 55 is the system of any of Examples 47-54, wherein the processing device is further to, responsive to determining that the first node device is available, deactivating the proxy device.

Example 56 is the system of any of Examples 47-55, wherein activating the proxy device is performed further responsive to determining that the unavailability of the first node device has exceed a defined time duration.

Unless specifically stated otherwise, terms such as "detecting," "activating," "controlling," "directing", "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operating a network comprising:
   responsive to detecting an unavailability of a first node device of a plurality of node devices of the network, activating a proxy device to correspond to the first node device;
   detecting a consensus operation among the plurality of node devices for a blockchain operation of a blockchain within the network, wherein the consensus operation comprises a plurality of vote transmissions associated with the blockchain within the network, wherein detecting the consensus operation comprises examining the approval status of each of the plurality of vote transmissions;
   controlling, by a processing device, content of a proxy vote transmission provided by the proxy device by setting the content of the proxy vote transmission based on an approval status of each of the plurality of vote transmissions, wherein the proxy vote transmission is associated with the blockchain and is provided by the proxy device as part of the consensus operation for the blockchain;
   on a condition that a count of the plurality of vote transmissions that indicate approval exceeds a defined vote threshold, transmitting instructions to the proxy device to transmit the proxy vote transmission comprising an approval of the consensus operation; and
   on a condition that the count of the plurality of vote transmissions that indicate approval does not exceed the defined vote threshold, transmitting instructions to the proxy device to transmit the proxy vote transmission comprising a disapproval of the consensus operation.

2. The method of claim 1, wherein the consensus operation comprises an operation to add a block to the blockchain.

3. The method of claim 1, wherein the activating the proxy device is performed further responsive to determining that a number of the plurality of node devices that have been detected as being unavailable exceeds a defined availability threshold.

4. The method of claim 3, wherein the defined availability threshold is greater than twenty-five percent of the plurality of node devices.

5. The method of claim 1, further comprising transmitting a transaction request on the network that indicates the proxy device corresponds to the first node device.

6. An apparatus comprising:
a memory; and
a processing device, operatively coupled to the memory, to:
responsive to detecting an unavailability of a first node device of a plurality of node devices of a network, activate a proxy device to correspond to the first node device;
detect a consensus operation among the plurality of node devices for a blockchain operation of a blockchain within the network, wherein the consensus operation comprises a plurality of vote transmissions associated with the blockchain within the network, wherein to detect the consensus operation is further to examine the approval status of each of the plurality of vote transmissions;
control content of a proxy vote transmission provided by the proxy device by setting the content of the proxy vote transmission based on an approval status of each of the plurality of vote transmissions, wherein the proxy vote transmission is associated with the blockchain and is provided by the proxy device as part of the consensus operation for the blockchain;
on a condition that a count of the plurality of vote transmissions that indicate approval exceeds a defined vote threshold, transmit instructions to the proxy device to transmit the proxy vote transmission comprising an approval of the consensus operation; and
on a condition that the count of the plurality of vote transmissions that indicate approval does not exceed the defined vote threshold, transmit instructions to the proxy device to transmit the proxy vote transmission comprising a disapproval of the consensus operation.

7. The apparatus of claim 6, wherein the consensus operation comprises an operation to add a block to the blockchain.

8. The apparatus of claim 6, wherein the processing device is to activate the proxy device further responsive to determining that a number of the plurality of node devices that have been detected as being unavailable exceeds a defined availability threshold.

9. The apparatus of claim 8, wherein the defined availability threshold is greater than twenty-five percent of the plurality of node devices.

10. The apparatus of claim 6, wherein the processing device is further to transmit a transaction request on the network that indicates the proxy device corresponds to the first node device.

11. A non-transitory computer-readable storage medium including instructions that, when executed by a processing device, cause the processing device to:
responsive to detecting an unavailability of a first node device of a plurality of node devices of a network, activate a proxy device to correspond to the first node device;
detect a consensus operation among the plurality of node devices for a blockchain operation of a blockchain within the network, wherein the consensus operation comprises a plurality of vote transmissions associated with the blockchain within the network, wherein to detect the consensus operation is further to examine the approval status of each of the plurality of vote transmissions;
control, by the processing device, content of a proxy vote transmission provided by the proxy device by setting the content of the proxy vote transmission based on an approval status of each of the plurality of vote transmissions, wherein the proxy vote transmission is associated with the blockchain and is provided by the proxy device as part of the consensus operation for the blockchain;
on a condition that a count of the plurality of vote transmissions that indicate approval exceeds a defined vote threshold, transmit instructions to the proxy device to transmit the proxy vote transmission comprising an approval of the consensus operation; and
on a condition that the count of the plurality of vote transmissions that indicate approval does not exceed the defined vote threshold, transmit instructions to the proxy device to transmit the proxy vote transmission comprising a disapproval of the consensus operation.

12. The non-transitory computer-readable storage medium of claim 11, wherein the consensus operation comprises an operation to add a block to the blockchain.

13. The non-transitory computer-readable storage medium of claim 11, wherein the processing device is to activate the proxy device further responsive to determining that a number of the plurality of node devices that have been detected as being unavailable exceeds a defined availability threshold.

14. The non-transitory computer-readable storage medium of claim 11, wherein the processing device is further to transmit a transaction request on the network that indicates the proxy device corresponds to the first node device.

* * * * *